M. LUCKIESH AND D. A. DEWEY.
COMPOSITION OF COLOR FILTER OR ABSORBING SCREEN FOR ARTIFICIAL LIGHT.
APPLICATION FILED AUG. 21, 1915. RENEWED NOV. 29, 1919.
1,331,937.
Patented Feb. 24, 1920.
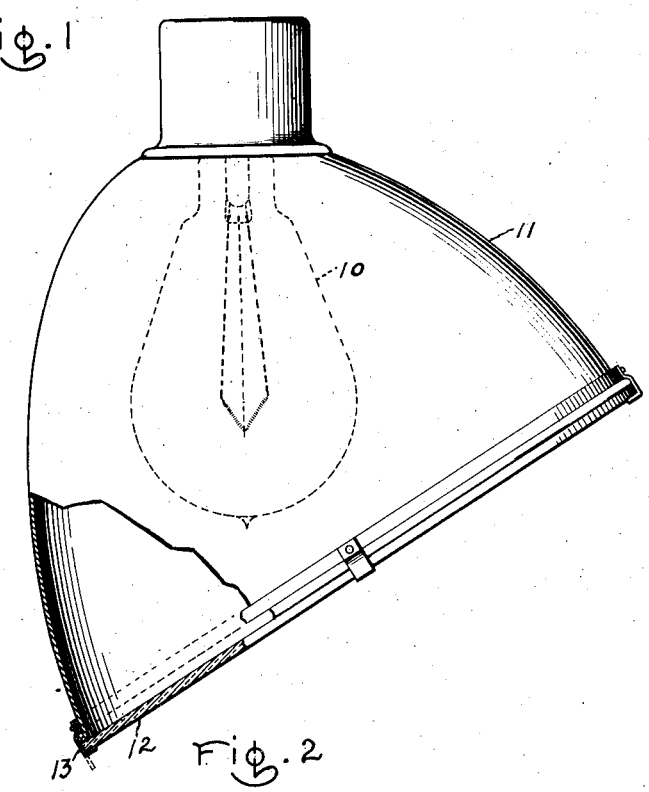
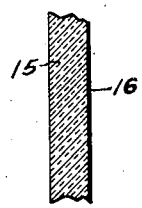
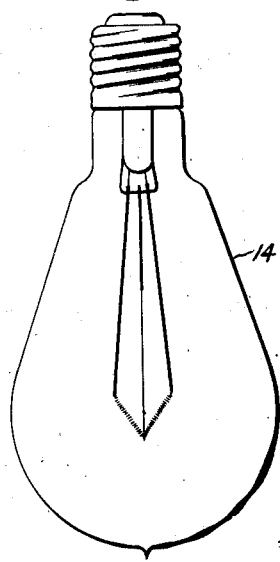
Inventors:
Matt Luckiesh
Don A. Dewey
by Albert S. Davis
Their Attorney

UNITED STATES PATENT OFFICE.

MATT LUCKIESH AND DON A. DEWEY, OF CLEVELAND, OHIO, ASSIGNORS TO GENERAL ELECTRIC COMPANY, A CORPORATION OF NEW YORK.

COMPOSITION OF COLOR-FILTER OR ABSORBING-SCREEN FOR ARTIFICIAL LIGHT.

1,331,937.   Specification of Letters Patent.   Patented Feb. 24, 1920.

Application filed August 21, 1915, Serial No. 46,737. Renewed November 29, 1919. Serial No. 341,469.

*To all whom it may concern:*

Be it known that we, MATT LUCKIESH and DON A. DEWEY, citizens of the United States, residing at Cleveland, in the county of Cuyahoga, State of Ohio, have invented certain new and useful Improvements in Composition of Color-Filters or Absorbing-Screens for Artifical Light, of which the following is a specification.

Our invention relates to color filters or absorbing screens adapted to be used in connection with artifical light for the purpose of producing an approximation to what is known as daylight. More particularly, our invention relates to means which may be used in connection with electric lamps, particularly electric incandescent lamps, to produce this result.

Heretofore it has been attempted to produce an integral glass which would serve as a color filter to produce an approximation to daylight. However, these attempts were unsuccessful and recourse was then had to the use of superposed screens. The superposed glass screen, however, is attended with considerable disadvantages. It is expensive and cumbersome and the number of shapes in which it can be utilized is unduly restricted. In view of the fact that it is necessary to combine several screens, the thickness of the screen as a whole must be considerable, and this causes undue absorption of light.

According to the present invention, the daylight effect is produced by means of an integral glass color screen which is substantially homogeneous throughout. By means of our invention the objections indicated above and applicable to other color filters or screens of this character are obviated, and at the same time a closer approximation to daylight is obtained than those obtained by previous attempts in this direction.

In the drawing are shown two examples of devices incorporating our invention. Figure 1 is an elevation, partly in section, of a combination lamp and shade embodying our invention. Fig. 2 is an elevation of an electric incandescent lamp the bulb of which is composed of glass embodying our invention. Fig. 3 is a section of a piece of glass embodying our invention.

Our invention is particularly adapted for use in connection with gas-filled lamps such as those described in Langmuir application Serial No. 762,327, filed April 19, 1913, and Orange application Serial No. 762,269, filed April 19, 1913. Lamps of this type have a high efficiency, and for this reason the color filter may be used in connection therewith with especial economy.

In Fig. 1, 10 is a lamp such as is described in the Langmuir and Orange applications hereinbefore referred to. 11 is a reflector which may be of any well-known character. The mouth of the said reflector is closed by a color filter 12 composed of glass made according to our invention. Any suitable fastening, such as 13, may be provided to hold the screen or filter in position.

In Fig. 2 is shown an incandescent lamp of the type described in the Langmuir and Orange applications hereinbefore referred to, the bulb 14 of which is composed of glass embodying our invention. The incorporation of this glass in the lamp itself affords a very convenient and economical method of applying our invention, since a lamp comprising such a bulb may be inserted in any fixture.

The following is an example of a batch which may be used to produce our glass.

| | |
|---|---|
| Sand | 1,500 lbs. |
| Soda | 535 lbs. |
| Lime | 160 lbs. |
| Niter | 50 lbs. |
| Arsenic | 5 lbs. |
| Manganese dioxid | 3 lbs. |
| Cupric oxid | $5\frac{3}{4}$ lbs. |
| Black oxid of cobalt | $\frac{26}{100}$ lbs. |

This batch results in a glass which is bluish in color but which has a slight greenish tinge. When a glass of this character is used in connection with a gas-filled lamp of the type herein-before referred to a very close approximation to various kinds of daylight is obtained, depending upon the thickness of the glass.

In certain cases it may be desirable to approximate more closely to skylight, and for this purpose a purple glaze may be applied to the surface of the glass made according to the formula stated above. One such glaze which has given very good results is made up of—

Vitrifiable carmine_____ 50 grams
Vitrifiable blue_____ 2½ grams
Vitrifiable flux_____ 30 grams These substances are known commercially as carmine No. 45, blue No. 245 and flux No. 10. The application of this mixture to the surface of the glass and the heating to a high temperature results in a transparent purplish glaze which is integrally united with the body of the glass. In Fig. 3 is shown a section of the glass in which the portion 15 is made according to the daylight glass formula given above and the portion 16 presents the glaze which has been described.

In certain cases it has been found desirable to somewhat decrease the proportion of black oxid of cobalt as contained in the formula given above. This has been done in cases where it is necessary to decrease the heat effect caused by a large proportion of the green element. This may be done to a certain extent without affecting substantially the daylight qualities of the glass.

It will be obvious that the proportions as stated above may be somewhat varied without departing from the spirit of the invention, the scope of which is stated in the following claims.

What we claim as new and desire to secure by Letters Patent of the United States, is:—

1. In a batch for making a color filter or absorbing screen for transforming the light of artificial illuminants to daylight character, a glass mixture containing manganese, copper and cobalt oxids in substantially the proportion of one part manganese dioxid to two parts copper and cobalt oxids.

2. A batch for making color filters or absorbing screens for transforming the light of artificial illuminants to daylight character containing substantially 2250 parts of a mixture capable of producing a clear glass and 9 parts of a mixture of manganese, copper and cobalt oxids.

3. In a batch for making color filters or absorbing screens for transforming the light of artificial illuminants to daylight character a glass mixture containing manganese, copper and cobalt oxids in substantially the proportions of 12 manganese dioxid, 22 copper and 1 cobalt oxids.

4. In a batch for making color filters or absorbing screens for transforming the light of artificial illuminants to daylight character, a glass mixture containing manganese, copper and cobalt oxids, in substantially the proportions of 1 part cobalt oxid to 34 parts manganese and copper oxids.

5. A color filter or absorbing screen for transforming the light of artificial illuminants to daylight character, comprising a glass of a composition containing substantially 7.6 parts manganese, 25 parts copper and 1 part cobalt.

6. A color filter or absorbing screen for transforming the light of artificial illuminants to daylight character, comprising a glass of a composition containing substantially 1 part cobalt and 7.6 parts manganese.

7. A color filter or absorbing screen for transforming the light of artificial illuminants to daylight character, comprising a glass composition containing substantially 1 part cobalt and 25 parts copper.

8. A glass for transforming the light of artificial illuminants to that having daylight character comprising constituents ordinarily found in clear glass, and copper, cobalt and manganese compounds in the proportion to give said glass a bluish color.

9. A bluish glass for use to produce daylight effects containing copper and manganese.

10. A bluish glass for use to produce daylight effects containing copper, manganese and cobalt.

In witness whereof we have hereunto set our hands this 18th day of August, 1915.

MATT LUCKIESH.
DON A. DEWEY.